United States Patent
Nakagawa et al.

(10) Patent No.: US 7,159,388 B2
(45) Date of Patent: Jan. 9, 2007

(54) AIR-FUEL RATIO CONTROL DEVICE FOR INTERNAL-COMBUSTION ENGINE

(75) Inventors: Norihisa Nakagawa, Numazu (JP); Takahiko Fujiwara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 160 days.

(21) Appl. No.: 10/881,177

(22) Filed: Jul. 1, 2004

(65) Prior Publication Data

US 2005/0022510 A1    Feb. 3, 2005

(30) Foreign Application Priority Data

Jul. 30, 2003 (JP) ............... 2003-283087

(51) Int. Cl.
*F01N 3/00* (2006.01)
*F01N 3/10* (2006.01)

(52) U.S. Cl. .................. 60/285; 60/277; 60/300
(58) Field of Classification Search .............. 60/274, 60/277, 285, 300
See application file for complete search history.

(56) References Cited

U.S. PATENT DOCUMENTS

| | | | | |
|---|---|---|---|---|
| 5,115,639 A | * | 5/1992 | Gopp | 60/274 |
| 5,228,286 A | * | 7/1993 | Demura | 60/276 |
| 5,319,921 A | * | 6/1994 | Gopp | 60/274 |
| 6,018,945 A | * | 2/2000 | Nakagawa | 60/285 |
| 6,502,389 B1 | * | 1/2003 | Katayama et al. | 60/285 |
| 6,668,813 B1 | * | 12/2003 | Azuma et al. | 123/687 |
| 6,941,745 B1 | * | 9/2005 | Ikemoto et al. | 60/285 |

FOREIGN PATENT DOCUMENTS

| | | |
|---|---|---|
| JP | A 6-101536 | 4/1994 |
| JP | A 7-197837 | 8/1995 |
| JP | A 9-60544 | 3/1997 |

* cited by examiner

*Primary Examiner*—Thomas Denion
*Assistant Examiner*—Loren C. Edwards
(74) *Attorney, Agent, or Firm*—Oliff & Berridge, PLC

(57) ABSTRACT

A catalyst is positioned in an exhaust path of an internal-combustion engine. A main air-fuel ratio sensor and sub-oxygen sensor are respectively positioned upstream and downstream of the catalyst. A main feedback operation is performed so that the output of the main air-fuel ratio sensor is fed back and reflected in the fuel injection quantity until the control A/F prevailing upstream of the catalyst coincides with the target A/F. A sub-feedback operation is performed so that the output of the sub-oxygen sensor is fed back and reflected in the fuel injection quantity until the air-fuel ratio of an exhaust gas flowing out of the catalyst agrees with a theoretical air-fuel ratio. Since a catalyst window varies in accordance with the intake air quantity, the fuel injection quantity is corrected so that the larger the intake air quantity becomes, the richer the control A/F is.

17 Claims, 11 Drawing Sheets

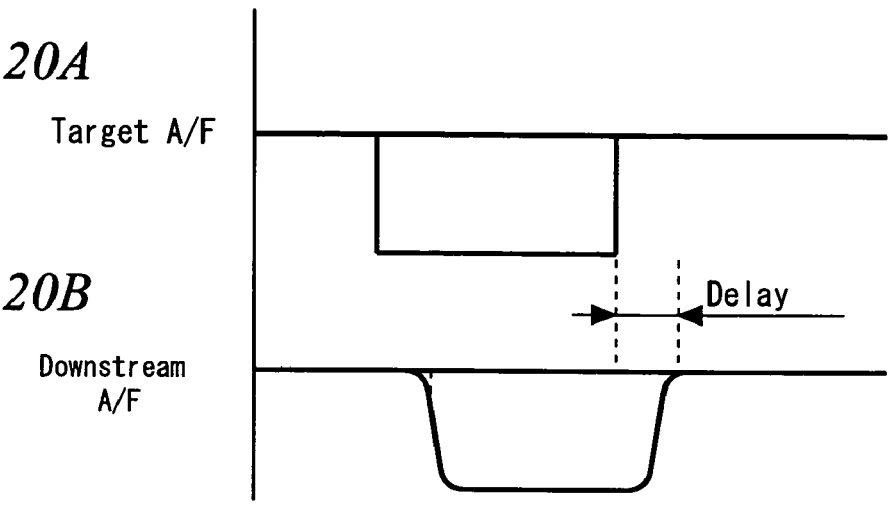
Fig. 20A Target A/F
Fig. 20B Downstream A/F
Delay
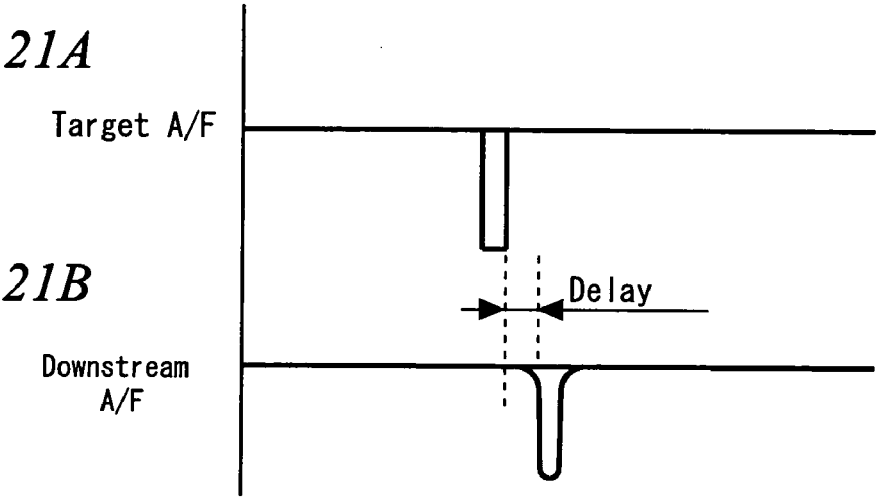
Fig. 21A Target A/F
Fig. 21B Downstream A/F
Delay

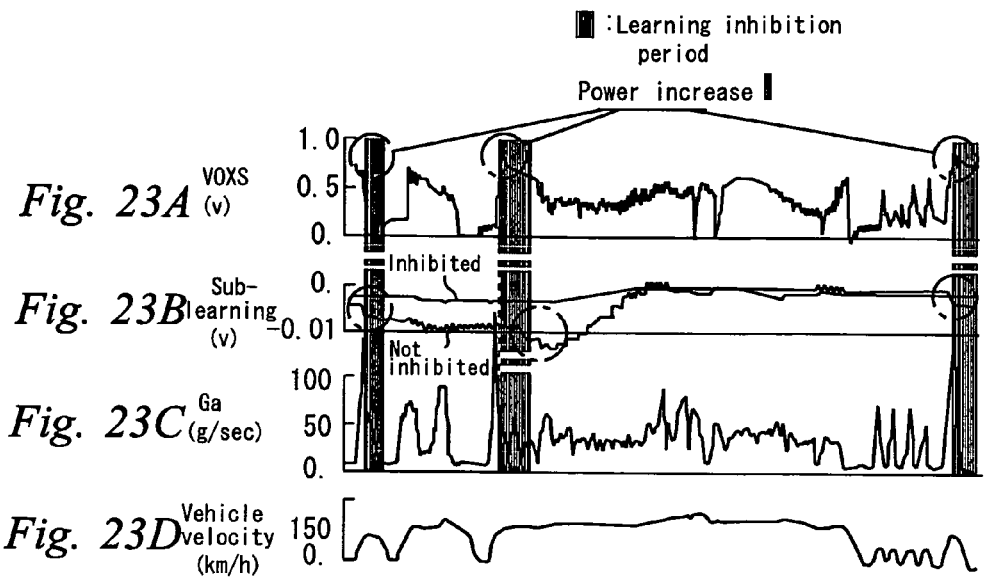
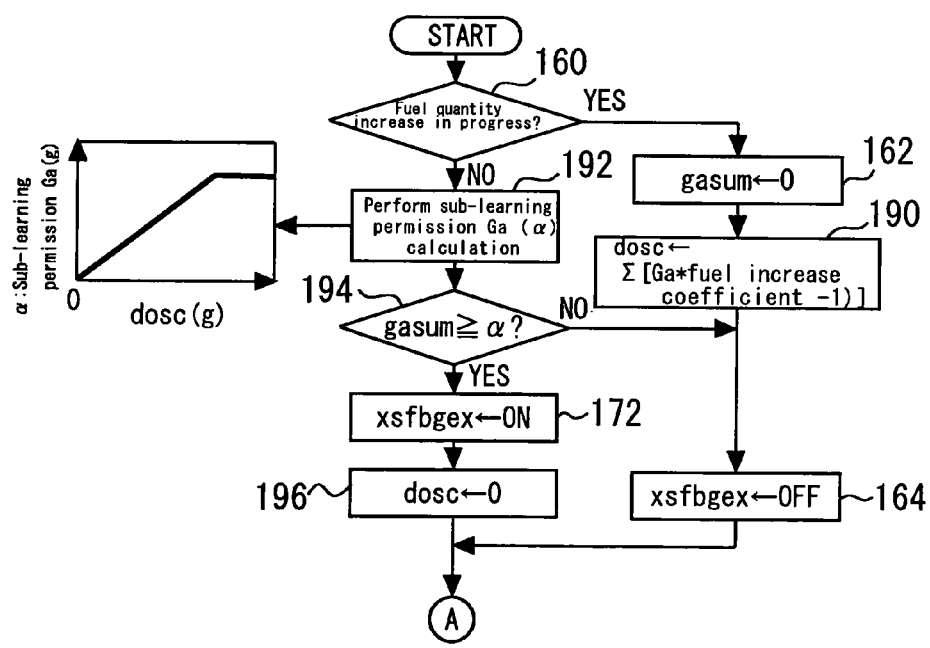

AIR-FUEL RATIO CONTROL DEVICE FOR INTERNAL-COMBUSTION ENGINE

BACKGROUND OF THE INVENTION

1. Field of the Invention

The present invention relates to an air-fuel ratio control device for an internal-combustion engine, and more particularly to an air-fuel ratio control device that is suitable as a device for controlling the air-fuel ratio of an internal-combustion engine having exhaust gas sensors at upstream and downstream of a catalyst positioned in an exhaust path.

2. Background Art

A related art internal-combustion engine that is disclosed, for instance, by Japanese Patent Laid-Open No. Hei7-197837 is equipped with two exhaust gas sensors that are mounted in an exhaust path of the internal-combustion engine. This internal-combustion engine is equipped with an air-fuel ratio sensor (sensor exhibiting a linear characteristic in relation to the air-fuel ratio), which is positioned upstream of a catalyst mounted in the exhaust path, and an oxygen sensor (sensor exhibiting a Z characteristic in relation to the air-fuel ratio), which is positioned downstream of the catalyst.

In the above related art internal-combustion engine, main feedback control is exercised in accordance with the output of the air-fuel ratio sensor, which is positioned upstream, and sub-feedback control is exercised in accordance with the output of the oxygen sensor, which is positioned downstream. In main feedback control, the fuel injection quantity is regulated so that the air-fuel ratio of an exhaust gas flowing into the catalyst coincides with a target air-fuel ratio. The catalyst has a catalyst window in which being capable of efficiently purifying the incoming exhaust gas. In other words, the catalyst exhibits a satisfactory purification characteristic when the air-fuel ratio of the incoming exhaust gas is within the catalyst window. The target air-fuel ratio is a predetermined value so as to be within the catalyst window. Therefore, if main feedback control is ideally exercised, the exhaust gas emitted from the internal-combustion engine is efficiently purified by the catalyst so that no unpurified component blows downstream of the catalyst.

However, a certain degree of error is superposed over the air-fuel ratio sensor output and various other elements involved in main feedback control. Therefore, even if main feedback control is exercised as described above, the air-fuel ratio of an exhaust gas flowing into the catalyst may, in reality, shift toward the rich side or lean side, thereby allowing an unpurified component to flow downstream of the catalyst. In the above-mentioned related art internal-combustion engine, sub-feedback control is exercised to correct a fuel injection quantity calculation method to avoid air-fuel ratio deviation, which causes an unpurified component flow, when an unpurified component flows downstream of the catalyst as described above. When such sub-feedback control is exercised, various influences of error can be corrected so as to accurately keep the actual air-fuel ratio close to the target air-fuel ratio.

However, the above-mentioned catalyst window may vary depending on the operation of the internal-combustion engine. In a situation where the main and sub-feedback control functions in such a manner that no unburned component flows downstream of the catalyst by a certain catalyst window, an unburned component may flow downstream of the catalyst if the catalyst window varies no matter whether the same feedback control is continuously exercised. Therefore, it is necessary in the related art internal-combustion engine described above to correct the contents of sub-feedback control for the purpose of complying with a renewed situation each time the operation thereof changes thereby the catalyst window varies. If the operation of the internal-combustion engine frequently changes, the corrections provided by sub-feedback control cannot comply with such a frequent change. As a result, the emission characteristic may deteriorate.

SUMMARY OF THE INVENTION

The present invention has been made to solve the foregoing problems and provides an air-fuel ratio control device that is used with an internal-combustion engine to constantly maintain a stable emission characteristic even when the operation of the internal-combustion engine frequently changes.

The above object of the present invention is achieved by an air-fuel ratio control device for an internal-combustion engine described below. A catalyst is provided in an exhaust path of the internal combustion engine. An upstream exhaust gas sensor is provided upstream of the catalyst. A downstream exhaust gas sensor is provided downstream of the catalyst. The control device includes a main feedback unit for feeding back the output of the upstream exhaust gas sensor to fuel injection quantity so that the air-fuel ratio of an exhaust gas flowing into the catalyst coincides with a target air-fuel ratio. The control unit also includes a sub-feedback unit for feeding back the output of the downstream exhaust gas sensor to the fuel injection quantity so that the air-fuel ratio of an exhaust gas flowing out of the catalyst coincides with a theoretical air-fuel ratio. The control device further includes an intake air quantity detection unit for detecting the intake air quantity of the internal-combustion engine. An injection quantity correction unit is provided for correcting the fuel injection quantity to ensure that the larger the intake air quantity becomes, the richer the air-fuel ratio of an exhaust gas flowing into the catalyst is.

The above object of the present invention is also achieved by an air-fuel ratio control device for an internal-combustion engine described below. A catalyst is provided in an exhaust path of the internal combustion engine. An upstream exhaust gas sensor is provided upstream of the catalyst. The control device includes a main feedback unit for feeding back the output of the upstream exhaust gas sensor to fuel injection quantity so that the air-fuel ratio of an exhaust gas flowing into the catalyst coincides with a target air-fuel ratio. The control device also includes an intake air quantity detection unit for detecting the intake air quantity of the internal-combustion engine. An injection quantity correction unit is provided for correcting the fuel injection quantity to ensure that the larger the intake air quantity becomes, the richer the air-fuel ratio of an exhaust gas flowing into the catalyst is.

Other objects and further features of the present invention will be apparent from the following detailed description when read in conjunction with the accompanying drawings.

BRIEF DESCRIPTION OF THE DRAWINGS

FIG. 20A shows the waveform of a target A/F that is targeted when the fuel quantity is increased;

FIG. 20B shows the waveform of a downstream A/F of an exhaust gas that is discharged downstream of an upstream catalyst upon a fuel quantity increase;

FIG. 21A shows the waveform of a target A/F for a case where the fuel quantity is increased for a short period of time;

FIG. 21B shows the waveform of a downstream A/F for a case where the fuel quantity is increased for a short period of time;

FIG. 23 is a timing diagram illustrating advantages that are provided by the sixth embodiment of the present invention; and FIG. 24 is a flowchart illustrating processing steps that a seventh embodiment of the present invention performs in replacement of steps 160 through 172, which are shown in FIG. 22.

BEST MODE FOR CARRYING OUT THE INVENTION

First Embodiment

[Configuration of a Device According to the First Embodiment]

Figure 1:
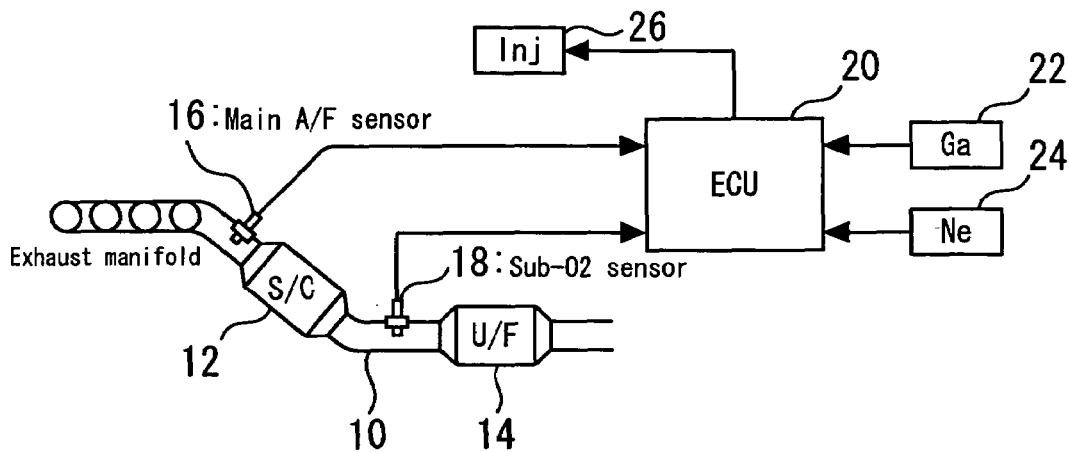
FIG. 1 illustrates the configuration of an air-fuel ratio control device according to a first embodiment of the present invention.

FIG. 1 illustrates the configuration of an air-fuel ratio control device according to a first embodiment of the present invention. As shown in FIG. 1, the device according to the present embodiment is provided with an upstream catalyst (S/C) 12 and a downstream catalyst (U/F) 14, which are positioned in an exhaust path 10 of an internal-combustion engine. Both the upstream catalyst 12 and downstream catalyst 14 are three-way catalysts that simultaneously purify CO, HC, and NOx.

A main air-fuel ratio sensor 16 and a sub-oxygen sensor 18 are respectively positioned upstream and downstream of the upstream catalyst 12. The main air-fuel ratio sensor 16 generates an output that is virtually linear with respect to the air-fuel ratio of an exhaust gas flowing into the upstream catalyst 12. On the other hand, the sub-oxygen sensor 18 rapidly changes its output depending on whether the exhaust gas flowing out of the upstream catalyst 12 is rich or lean with respect to a theoretical air-fuel ratio.

The output of the main air-fuel ratio sensor 16 and the output of the sub-oxygen sensor 18 are both supplied to an ECU (electronic control unit) 20. The ECU 20 is connected, for instance, to an air flow meter 22, a revolving speed sensor 24, and a fuel injection valve 26. The air flow meter 22 is a sensor for detecting the intake air quantity Ga of the internal-combustion engine. The revolving speed sensor 24 generates an output that corresponds to the engine revolving speed Ne. The fuel injection valve 26 is a solenoid valve for injecting fuel into an intake port of the internal-combustion engine.

[Basic Operation of the Device According to the First Embodiment]

The device according to the present embodiment exercises air-fuel ratio feedback control in accordance with the output from the main air-fuel ratio sensor 16, the output from the sub-oxygen sensor 18 and the like. More specifically, air-fuel ratio feedback control is exercised to perform (a) a process for calculating the corrected air-fuel ratio output (corrected A/F output) "evabyf" on the basis of the output "evafbse" from the main air-fuel ratio sensor 16 and (b) a process for controlling the fuel injection quantity on the basis of the corrected A/F output "evabyf" so that the air-fuel ratio of an exhaust gas discharged from the internal-combustion engine (hereinafter referred to as the "control A/F") actually coincides with a target air-fuel ratio (this process is hereinafter referred to as the "main feedback control").

As described earlier, the main air-fuel ratio sensor 16 is manufactured on the assumption that its output is virtually linear with respect to the control A/F. When the sensor exhibits an ideal characteristic, the relationship between its output "evafbse" and control A/F is unambiguous (relationship between corrected A/F output "evabyf" and control A/F shown in FIG. 2). In this instance, the output "evabyf" of the main air-fuel ratio sensor 16 can be used as a substitute value for the control A/F.

However, the influence of variations of the main air-fuel ratio sensor 16 and variations of wiring harness and other signal transmission system components is superposed over the output "evafbse" of the main air-fuel ratio sensor 16. Therefore, an unambiguous relationship is not always established between the output "evafbse" of the main air-fuel ratio sensor 16 and control A/F, which are detected by the ECU 20. Therefore, the ECU 20 properly corrects the output "evafbse" of the main air-fuel ratio sensor 16 in accordance with the output of the sub-oxygen sensor 18 and the like to generate a corrected A/F output "evabyf", which represents an ideal output that should be generated by the main air-fuel ratio sensor 16 (process (a) above; the generation method will be described in detail later).

Figure 2:
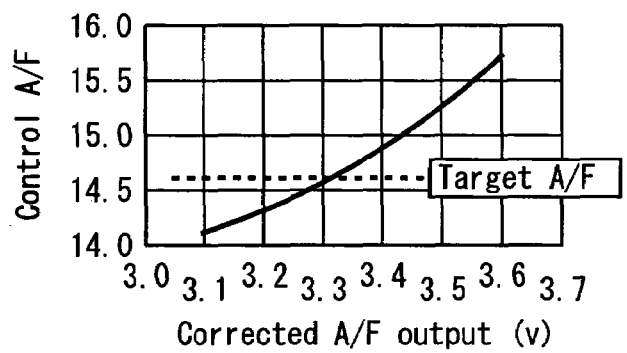
FIG. 2 illustrates the relationship between a corrected A/F output and control A/F, which are used in the first embodiment of the present invention.

FIG. 2 illustrates the relationship between the corrected A/F output "evabyf" and control A/F. If the corrected A/F output "evabyf" is an ideal output that should be generated by the main air-fuel ratio sensor 16, an unambiguous relationship is established between the corrected A/F output "evabyf" and control A/F as shown in FIG. 2. In such an instance, the corrected A/F output "evabyf" can be handled as a substitute value for the control A/F.

The target A/F indicated by a broken line in FIG. 2 is a target value for the control A/F, which should be attained in the internal-combustion engine. If the control A/F estimated from the corrected A/F output "evabyf" is greater than the target A/F, it can be concluded that the control A/F is lean. In such an instance, the main feedback control exercised by the ECU 20 functions in principle so as to increase the fuel injection quantity by a controlled amount that is obtained by multiplying a predetermined rich side gain by the difference between the control A/F and target A/F. As a result, the control A/F shifts toward the rich side and becomes close to the target A/F. If, on the other hand, the control A/F estimated from the corrected A/F output "evabyf" is smaller than the target A/F, it can be concluded that the control A/F is rich. In such an instance, the main feedback control exercised by the ECU 20 functions in principle so as to decrease the fuel injection quantity by a controlled amount that is obtained by multiplying a predetermined lean side gain by the difference between the control A/F and target A/F. As a result, the control A/F shifts toward the lean side and becomes close to the target A/F. The ECU 20 controls the control A/F to be close to the target A/F by a manner described above (process (b) above).

When the corrected A/F output "evabyf" is to be calculated, the output "evafbse" of the main air-fuel ratio sensor 16 is corrected as follows. For example, it may be (i) corrected on the basis of stoichiometry point learning, (ii) corrected by sub-feedback control, or (iii) corrected on the basis of sub-feedback learning.

(i) Stoichiometry point learning is conducted to correct the influence of variations of a wiring harness and the like on the output of the main air-fuel ratio sensor 16. More specifically, the persistent error superposed over the output "evafbse" of the main air-fuel ratio sensor 16, which is recognized by the ECU 20, is learned as the stoichiometry learning amount "evafofs". When calculating the corrected A/F output "evabyf", the ECU 20 adds the stoichiometry learning amount "evafofs" to the output "evafbse" of the main air-fuel ratio sensor 16. This process can exclude a persistent error, which is caused by variations of the wiring harness or the like, from the corrected A/F output "evabyf". The method for calculating the stoichiometry learning amount "evafofs" is not a major part of the present invention and will not be described in detail herein.

(ii) Sub-feedback control is complementary to main feedback control and exercised to enhance the emission characteristic of the internal-combustion engine. The target A/F used for main feedback control is set at an air-fuel ratio at which three-way catalyst (upstream catalyst 12 and downstream catalyst 14 in this embodiment) can purify the exhaust gas with the highest efficiency. If main feedback control is exercised at such a setting so that the control A/F equally exhibits a rich side deflection and lean side deflection from the target A/F, adequate purification is provided by the upstream catalyst 12. Therefore, no unpurified component blows downstream of the upstream catalyst 12, i.e., around the sub-oxygen sensor 18.

However, when main feedback control is exercised in the internal-combustion engine, the control A/F may deviate from the target A/F and become biased toward the rich side or lean side due to various variations. If the control A/F is continuously biased toward the rich side, the upstream catalyst 12 soon fail to purify HC and CO so that an exhaust gas containing such components flows downstream. If, on the contrary, the control A/F is continuously biased toward the lean side, an exhaust gas containing NOx soon flows downstream of the upstream catalyst 12.

If an exhaust gas containing HC and CO flows downstream of the upstream catalyst 12, the output of the sub-oxygen sensor 18 becomes rich. If, on the other hand, an exhaust gas containing NOx flows downstream of the upstream catalyst 12, the output of the sub-oxygen sensor 18 becomes lean. Therefore, if the output of the sub-oxygen sensor 18 reverses to become rich, the ECU 20 can conclude that the control A/F tends to become biased toward the rich side. If, on the other hand, the output of the sub-oxygen sensor 18 reverses to become lean, the ECU 20 can conclude that the control A/F tends to become biased toward the lean side.

According to the sub-feedback control, there is calculated sub-feedback correction amount."evafsfb" to be added to the output "evafbse" of the main air-fuel ratio sensor 16 during the process for calculating the corrected A/F output "evabyf". If it is concluded that the control A/F is biased toward the rich side, the sub-feedback correction amount "evafsfb" is adjusted in the negative direction (which enriches the corrected A/F output "evabyf") for update purposes. If, on the contrary, it is concluded that the control A/F is biased toward the lean side, the sub-feedback correction amount "evafsfb" is adjusted in the positive direction (which makes the corrected A/F output "evabyf" lean) for update purposes. According to such a sub-feedback correction, the corrected A/F output "evabyf" can be rendered close to the real control A/F. As a result, main feedback control can be exercised to achieve high air-fuel ratio control accuracy.

(iii) In sub-feedback learning, the persistent error superposed over various elements involved in the execution of main feedback control is learned as a sub-feedback learning amount "evafsfbg". More specifically, the process for replacing the average value of the sub-feedback correction amount "evafsfb" with the sub-feedback learning amount "evafsfbg" is performed with appropriate timing. As is the case with the sub-feedback correction amount "evafsfb", the sub-feedback learning amount "evafsfbg" is a value that is added to the main air-fuel ratio sensor output "evafbse" during the process for calculating the corrected A/F output "evabyf". If the sub-feedback correction amount "evafsfb" contains even a persistent error, it takes a long period of time for the value of the sub-feedback correction amount "evafsfb" to be updated to a proper value. If the persistent error is transferred to sub-feedback learning amount "evafsfbg", the time required for the sub-feedback correction amount "evafsfb" to become updated can be reduced. As a result, air-fuel ratio control accuracy can be enhanced.

[Characteristic Operation of the Device According to the First Embodiment]

As described above, the device according to the present embodiment provides high-precision air-fuel ratio control by performing a main feedback control process in conjunction with a sub-feedback control process. In addition to these processes, the device according to the present embodiment performs a catalyst characteristic correction process to further enhance air-fuel ratio control accuracy.

Figure 3:
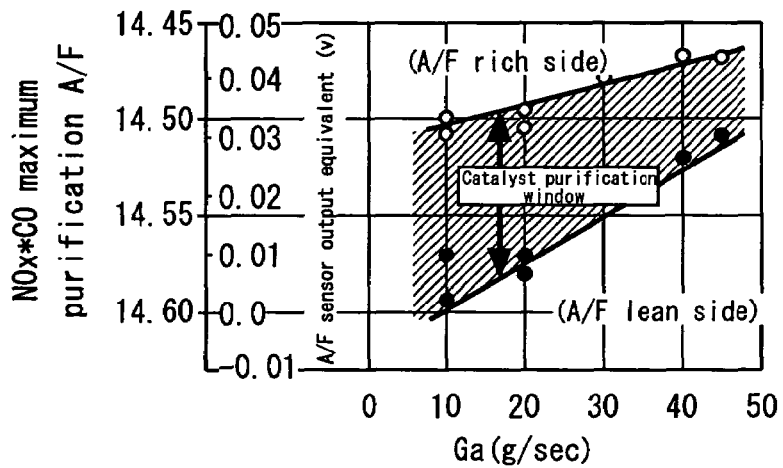
FIG. 3 illustrates the relationship between an internal-combustion engine intake air quantity and three-way catalyst window.

FIG. 3 illustrates the relationship between the intake air quantity Ga of the internal-combustion engine and the catalyst window for a three-way catalyst. As indicated in FIG. 3, the three-way catalyst has the catalyst window in which being capable of efficient purification of unpurified components (HC, CO, and NOx) in the exhaust gas. In other words, the three-way catalysts purify the exhaust gas with the highest efficiency when the air-fuel ratio of the exhaust gas is within the catalyst window shown in FIG. 3. The catalyst window is dependent on the intake air quantity Ga as indicated in FIG. 3. To obtain a satisfactory emission characteristic from the device according to the present embodiment, it is therefore necessary to vary the control A/F appropriately in accordance with the changes in the intake air quantity Ga.

The above functionality can be eventually implemented by combining the above-mentioned main feedback control function and sub-feedback control function. The subsequent explanation describes how the above functionality is implemented merely by combining the main feedback control function with the sub-feedback control function on the assumption that the target A/F used for main feedback control is 14.6.

When the target A/F is 14.6, the device according to the present embodiment exercises the main feedback control function to calculate the fuel injection quantity so that the corrected A/F output "evabyf" always corresponds to the value 14.6. The example shown in FIG. 3 indicates that the value 14.6 is contained in the catalyst window when the intake air quantity Ga is 10 g/sec. In such an instance, as far as the actual control A/F is controlled at the target A/F (14.6) and the main air-fuel ratio sensor 16 generates an output "evafbse" corresponding to the value 14.6, neither the sub-feedback correction value "evafsfb" nor sub-feedback learning amount "evafsfbg" will be requested to significantly change for an update.

If the intake air quantity Ga changes from 10 g/sec to 20 g/sec in the above situation, the current control A/F (14.6) leaves the catalyst window and shifts toward the lean side. If this condition is allowed to continue, an exhaust gas having a lean air-fuel ratio flows downstream of the upstream catalyst 12 so that the sub-feedback correction amount "evafsfb" (or the sub-feedback learning amount "evafsfbg") begins to change in the positive direction for update purposes. As a result, the corrected A/F output "evabyf" turns out to be a value greater than a value corresponding to the target A/F (3.3 V in the example shown in FIG. 2). If the corrected A/F output "evabyf" changes in this manner, the ECU 20 corrects, by means of the main feedback control function, the fuel injection quantity so that the value of the corrected A/F output "evabyf" reduces. More specifically, the ECU 20 increases the fuel injection quantity so as to decrease the output "evafbse" of the main air-fuel ratio sensor 16. As a result, the actual control A/F value becomes smaller than the target A/F value (14.6) (enrichment occurs), thereby the control A/F is contained in the catalyst window eventually.

If the catalyst window changes due to a change in the intake air quantity Ga in a situation where main feedback control is exercised in conjunction with sub-feedback control, a change in the sub-feedback correction amount "evafsfb" (or sub-feedback learning amount "evafsfbg") occurs following such a change as described above. Eventually, the actual control A/F is contained in the catalyst window prevailing after the change. Therefore, the use of the above control functionality implements the emission characteristic to a certain degree.

However, when the above control functionality is exercised, an exhaust gas containing unpurified components flows downstream of the upstream catalyst 12 during the time interval between the instant at which the catalyst window changes and the instant at which the control A/F is contained in the window. To constantly maintain a satisfactory emission characteristic of the internal-combustion engine, it is preferred that the outflow of the unpurified components be minimized. Such an outflow can be effectively minimized by promptly changing the actual control A/F to follow catalyst window changes.

Figure 4:
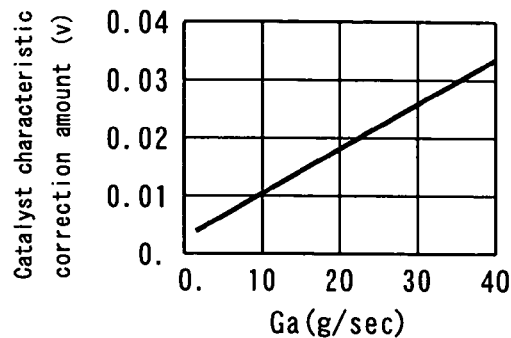
FIG. 4 illustrates a catalyst characteristic correction amount that is used in the first embodiment of the present invention.

FIG. 4 illustrates a catalyst characteristic correction amount "evafcat", which is introduced into the present embodiment to implement the above functionality. As is the case with the sub-feedback correction amount "evafsfb" and the like, the catalyst characteristic correction amount "evafcat" is a correction term that is to be added to the corrected A/F output "evabyf". As indicated by the comparison between FIGS. 3 and 4, the catalyst characteristic correction amount "evafcat" is set so that it exhibits the same dependence on the intake air quantity Ga as the catalyst window.

If, for instance, the intake air quantity Ga changes from 10 g/sec to 20 g/sec, the catalyst characteristic correction amount "evafcat" changes from approximately 0.01 V to approximately 0.02 V. When such a change occurs in the catalyst characteristic correction amount "evafcat", the corrected A/F output "evabyf" increases by approximately 0.01 V. When the corrected A/F output "evabyf" increases by approximately 0.01 V, the ECU 20 concludes that the control A/F is leaner than the target A/F by 0.01 V (see FIG. 2), and then enriches the control A/F by 0.01 V. According to the example shown in FIG. 3, the catalyst window is enriched by approximately 0.01 V in terms of the output of the main air-fuel ratio sensor 16 when the intake air quantity Ga increases from 10 g/sec to 20 g/sec. Therefore, if the control A/F is within the catalyst window while the intake air quantity Ga is 10 g/sec, and the control A/F is enriched by 0.01 V when the intake air quantity Ga increases to 20 g/sec, the control A/F is naturally within the catalyst window immediately after such a change.

As described above, when the catalyst characteristic correction amount "evafcat" shown in FIG. 4 is added to the output "evafbse" of the main air-fuel ratio sensor 16 in a process for calculating the corrected A/F output "evabyf", the actual control A/F can be varied in a feed-forward manner by the amount equivalent to a catalyst window change, which is caused by a change in the intake air quantity Ga. Therefore, the device according to the present embodiment provides an excellent emission characteristic without regard to the dependence of the catalyst window on the intake air quantity Ga even when the intake air quantity Ga drastically changes.

[Details of a Process Performed by the ECU]

Figure 5:
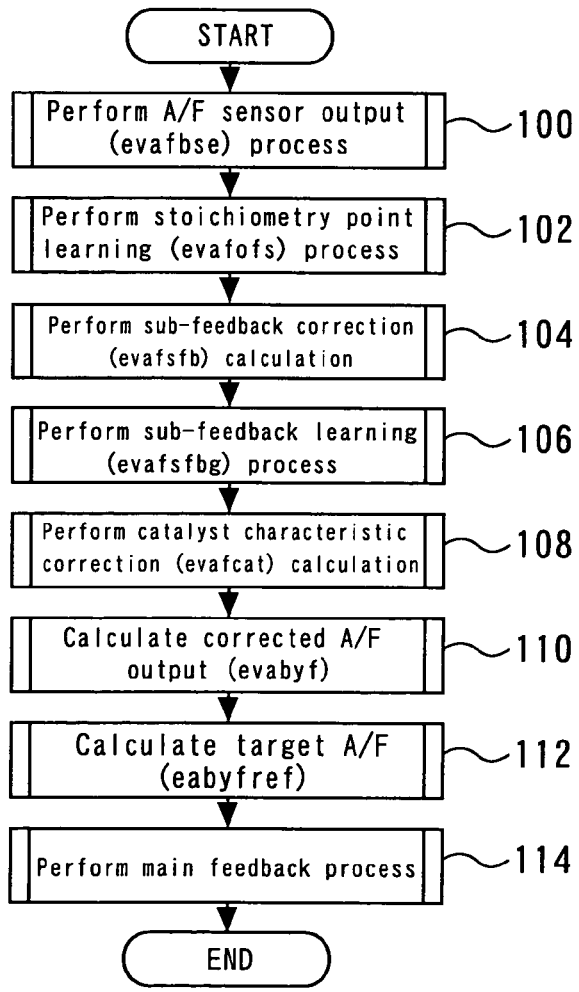
FIG. 5 is a flowchart illustrating a routine that is executed by the first embodiment of the present invention.

FIG. 5 is a flowchart illustrating a routine that the ECU 20 performs to implement the above functionality in the present embodiment. In the routine shown in FIG. 5, step 100 is first executed to perform a process for acquiring the output "evafbse" of the main air-fuel ratio sensor 16. Next, step 102 is exercised to perform a process related to the stoichiometry point learning amount "evafofs". More specifically, step 102 is performed to update the stoichiometry point learning amount "evafofs" on the condition that the stoichiometry point learning conditions are established.

Next, step 104 is followed to perform a process for calculating the sub-feedback correction amount "evafsfb". More specifically, step 104 is performed on the condition that the sub-feedback execution conditions be established. If the output of the sub-oxygen sensor 18 reverses to become rich, step 104 is followed to perform an update process for shifting the sub-feedback correction amount "evafsfb" in the negative direction at a predetermined gain (lean side gain). If, on the other hand, the output of the sub-oxygen sensor 18 reverses to become lean, step 104 is followed to perform an update process for shifting the sub-feedback correction amount "evafsfb" in the positive direction at a predetermined gain (rich side gain).

Next, step 106 is followed to perform a process related to the sub-feedback learning amount "evafsfbg". More specifically, the process is performed with predetermined timing to replace the average value of the sub-feedback correction amount "evafsfb" with the sub-feedback learning amount "evafsfbg". In other words, the process is performed to increase or decrease the sub-feedback learning amount "evafsfbg" by the average value and decrease or increase the sub-feedback correction amount "evafsfb" by the average value.

Next, step 108 is followed to perform a process related to the catalyst characteristic correction amount "evafcat". The ECU 20 memorizes a map such like shown in FIG. 4 of the catalyst characteristic correction amount "evafcat", which is defined in relation to the intake air quantity Ga. In step 108, the map is referenced to perform a process for calculating the catalyst characteristic correction amount "evafcat" that corresponds to the current intake air quantity Ga.

Step 110, which is included in the routine shown in FIG. 5, is then performed to calculate the corrected A/F output "evabyf" in accordance with the arithmetic expression shown below:

$$evabyf = evafbse + evafofs + evafsfb + evafsfbg + evafcat \quad (1)$$

Next, step 112 is performed to acquire the target A/F (a fixed value of 14.6 in the present embodiment) that should be achieved by performing an air-fuel ratio feedback sequence.

Finally, step 114 is executed to perform a main feedback process, that is, a process for controlling the fuel injection quantity so that the corrected A/F output "evabyf" coincides with a value corresponding to the target A/F. In theory, if the value of the corrected A/F output "evabyf" that is recalculated in terms of the air-fuel ratio is greater than the target A/F, a process is performed to increase the fuel injection quantity by a value that is determined by multiplying the difference ΔA/F between the recalculated value and target A/F value by the rich-side gain. If, on the other hand, the value of the corrected A/F output "evabyf" that is recalculated in terms of the air-fuel ratio is smaller than the target A/F, a process is performed to decrease the fuel injection quantity by a value that is determined by multiplying the difference ΔA/F between the recalculated value and target A/F value by the lean-side gain.

As described above, the routine shown in FIG. 5 implements a process employing the catalyst characteristic correction amount "evafcat", that is, a process for varying the control A/F in a feed-forward manner in order to follow catalyst window changes, while exercising main feedback control and sub-feedback control in coordination with each other. Therefore, the air-fuel ratio control device according to the present embodiment provides a stable emission characteristic even when the intake air quantity Ga drastically changes.

Second Embodiment

A second embodiment of the present invention will now be described with reference to FIGS. 6 and 7. The device according to the second embodiment is implemented by causing the ECU 20 in the device according to the first embodiment to execute a routine shown in FIG. 6, which will be described later, in replacement of the routine shown in FIG. 5.

The device according to the first embodiment causes the control A/F to follow catalyst window changes by varying the corrected A/F output "evabyf" in accordance with the intake air quantity Ga while keeping the target A/F constant. On the other hand, the device according to the second embodiment implements the same functionality as that of the first embodiment by varying the target A/F in accordance with the intake air quantity Ga without making the corrected A/F output "evabyf" dependent on the intake air quantity Ga.

Figure 6:
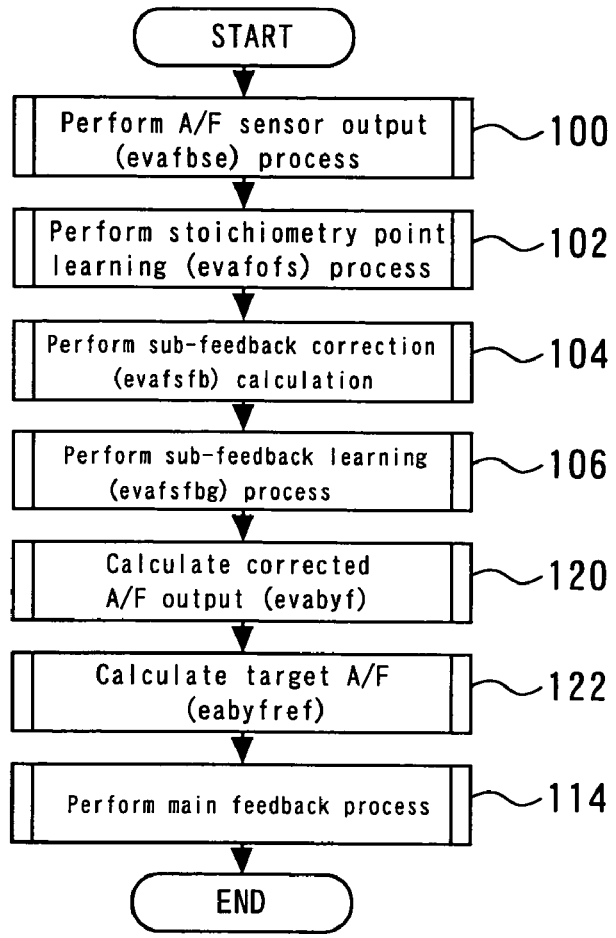
FIG. 6 is a flowchart illustrating a routine that is executed by a second embodiment of the present invention.

FIG. 6 is a flowchart illustrating a routine that the ECU 20 performs to implement the above functionality in the present embodiment. This routine is the same as the routine shown in FIG. 5 except that processing steps 108 through 112 are replaced by processing steps 120 and 122. Steps that are indicated in FIG. 6 and identical with the steps shown in FIG. 5 are assigned the same reference numerals as their counterparts and will be briefly described or will not be described again.

After termination of processing step 106 in the routine shown in FIG. 6, step 120 is performed to calculate the corrected A/F output "evabyf" in accordance with the arithmetic expression shown below. The corrected A/F output "evabyf" that is calculated herein is the same as the value calculated in step 110 of the first embodiment except that the catalyst characteristic correction amount "evafcat" is not added.

$$evabyf = evafbse + evafofs + evafsfb + evafsfbg \quad (2)$$

Figure 7:
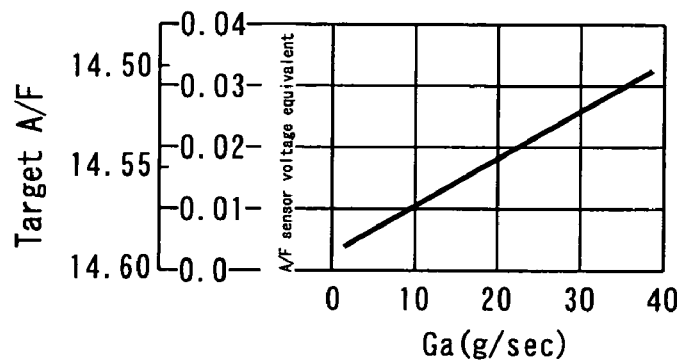
FIG. 7 shows an example of a target A/F map that is referenced in step 122, which is shown in FIG. 6.

Next, step 122, which is included in the routine shown in FIG. 6, is performed to reference a map shown in FIG. 7 and set the target A/F. As indicated in FIG. 7, the ECU 20 according to the present embodiment memorizes a map of the target A/F, which is defined in relation to the intake air quantity Ga. This map is set so that the target A/F exhibits the same dependence on the intake air quantity Ga as the catalyst window, as is the case with the map of the catalyst characteristic correction amount "evafcat" used in the first embodiment. Further, the map shown in FIG. 7 is defined so that the target A/F designated in the map is contained within the catalyst window shown in FIG. 3 no matter what value the intake air quantity Ga takes on.

Next, step 114, which is included in the routine shown in FIG. 6, is followed to perform a main feedback process. In the main feedback process, the fuel injection quantity is controlled so that the control A/F coincides with the target A/F. As a result, the control A/F follows changes in the intake air quantity Ga and is always contained in the catalyst window. Therefore, the device according to the present embodiment provides an excellent emission characteristic when the intake air quantity Ga drastically changes, as is the case with the device according to the first embodiment.

Third Embodiment

A third embodiment of the present invention will now be described with reference to FIGS. 8 and 9. The device according to the third embodiment is implemented by causing the ECU 20 in the device according to the first embodiment to execute a routine shown in FIG. 8, which will be described later, in replacement of the routine shown in FIG. 5.

As is the case with the device according to the first or second embodiment, the device according to the third embodiment exercises main feedback control so that the value of the corrected A/F output "evabyf" corresponds to the target A/F. In this instance, the actual control A/F can be varied to rich or lean by changing the ratio (GR/GL) of the rich-side gain GR and lean-side gain GL, which is used for main feedback control as well as by changing the corrected A/F output "evabyf" or target A/F. More specifically, the control A/F can be shifted toward the rich side by increasing the ratio GR/GL and shifted toward the lean side by decreasing the ratio GR/GL. In the present embodiment, therefore, the ratio GR/GL is varied in accordance with the intake air quantity Ga to ensure that the control A/F follows catalyst window changes.

Figure 8:
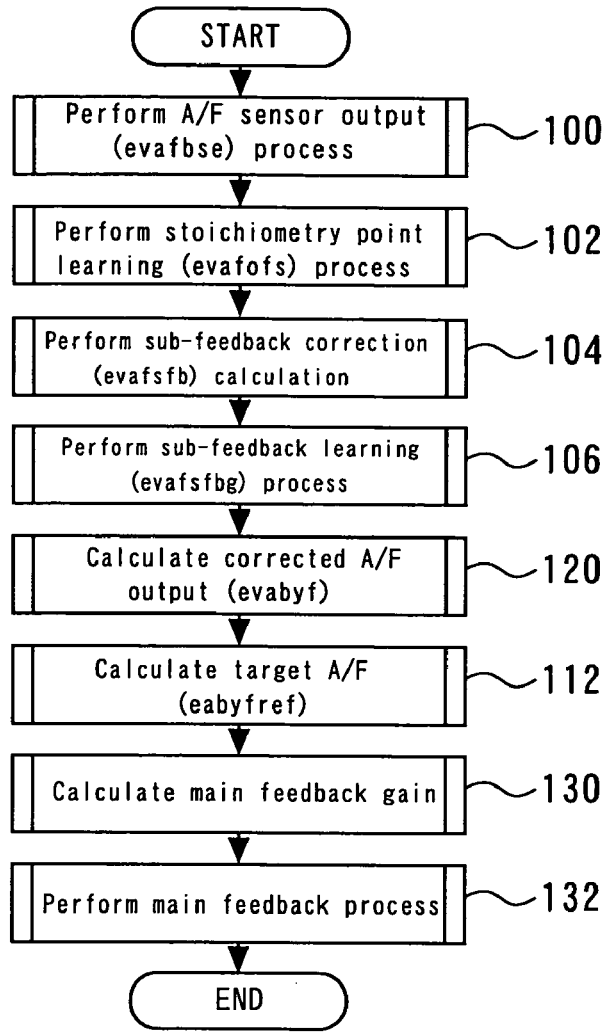
FIG. 8 is a flowchart illustrating a routine that is executed by a third embodiment of the present invention.
Figure 9:
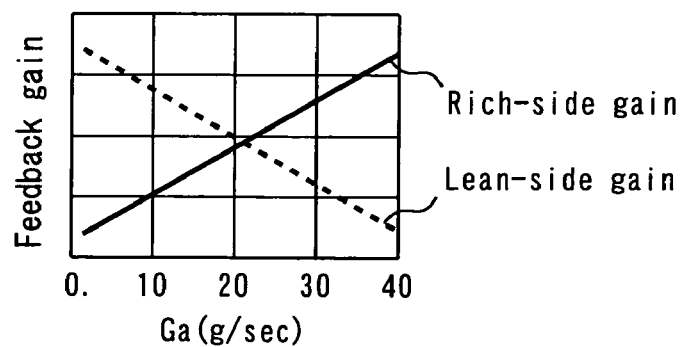
FIG. 9 shows an example of a feedback gain map that is referenced in step 130, which is shown in FIG. 8.

FIG. 8 is a flowchart illustrating a routine that the ECU 20 performs to implement the above functionality in the present embodiment. This routine is the same as the routine shown in FIG. 5 except that step 108 (calculating the catalyst characteristic correction amount "evafcat") is deleted, and that step 110 is replaced by the previously described step 120 (see FIG. 6), and further that step 114 (main feedback process) is replaced by steps 130 and 132. Steps that are indicated in FIG. 8 and identical with the steps shown in FIG. 5 or 6 are assigned the same reference numerals as their counterparts and will be briefly described or will not be described again.

After the target A/F is set by processing step 112, which is included in the routine shown in FIG. 8, step 130 is followed to perform a process for calculating the rich-side gain GR and lean-side gain GL, which are used for main feedback control. As indicated in FIG. 9, the ECU 20 memorizes a map of the rich-side gain GR and lean-side gain GL, which are defined in relation to the intake air quantity Ga. The map is set so that the ratio (GR/GL) of the rich-side gain GR and lean-side gain GL increases with an increase in the intake air quantity Ga. In step 130, the map is referenced to set the values GR and GL in accordance with the intake air quantity Ga.

Next, step 132, which is included in the routine shown in FIG. 8, is followed to perform a main feedback process by using the rich-side gain GR and lean-side gain GL, which are set in step 130 above. According to the above-mentioned principle, the control A/F tends to become richer as the intake air quantity Ga increases if the rich-side gain GR and lean-side gain GL are set in accordance with the map shown in FIG. 9. More specifically, the map shown in FIG. 9 is set so that the tendency of control A/F enrichment agrees with the tendency of catalyst window variation. In this instance, the control A/F is contained in the catalyst window no matter what value the intake air quantity Ga takes on, as is the case with the execution of the routine shown in FIG. 5 or 6. Therefore, the device according to the present embodiment provides an excellent emission characteristic when the intake air quantity Ga drastically changes, as is the case with the device according to the first or second embodiment.

In the third embodiment described above, the rich-side gain GR and lean-side gain GL for use in main feedback are varied in accordance with the intake air quantity Ga. However, an alternative variation target may be used. More specifically, the rich-side gain and lean-side gain for use in sub-feedback may be varied instead of or in addition to the rich-side gain GR and lean-side gain GL for use in main feedback.

Fourth Embodiment

A fourth embodiment of the present invention will now be described with reference to FIGS. 10 through 12. The device according to the fourth embodiment is implemented by causing the ECU 20 in the device according to the first embodiment to execute processing steps 140 and 142, which are shown in FIG. 11, in replacement of processing step 108 above (see FIG. 5).

Three-way catalyst which constitutes the upstream catalyst 12 or the downstream catalyst 14 exhibits an excellent purification capability in a situation where being able to sufficiently occlude oxygen in the exhaust gas and sufficiently supply oxygen into the exhaust gas. To continuously maintain such a state, it is necessary that the amount of occluded oxygen balance with the amount of discharged oxygen within the three-way catalyst. The catalyst window represents an air-fuel ratio range within which such a balance is attained. Therefore, the three-way catalyst exhibits an excellent purification capability when the exhaust A/F is within the catalyst window.

Figure 10:
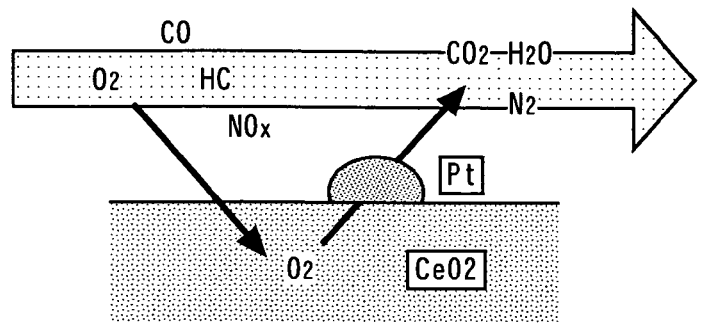
FIG. 10 illustrates oxygen's adsorption/desorption reaction within a three-way catalyst.
Figure 11:
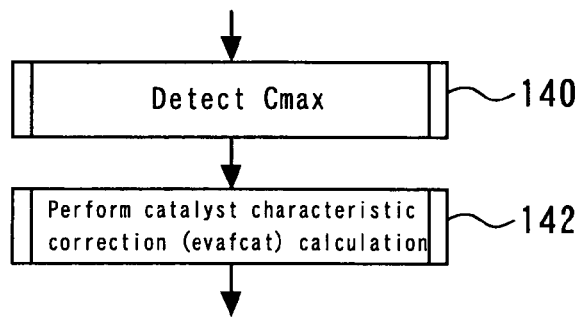
FIG. 11 is a flowchart illustrating processing steps that a fourth embodiment of the present invention performs in replacement of step 108, which is shown in FIG. 5.

FIG. 10 illustrates the oxygen's adsorption/desorption reaction in the three-way catalyst. The three-way catalyst includes a carrier, which comprises $CeO_2$, and Pt or other precious metal on the surface of the carrier. As shown in FIG. 10, the three-way catalyst can directly adsorb the oxygen contained in the exhaust gas into $CeO_2$. Meanwhile, they require a reaction, in which Pt or the like is used as a catalyst, when discharging the occluded oxygen. Within the three-way catalysts, therefore, the oxygen is promptly acquired and slowly discharged.

To balance the amount of adsorbed oxygen with the amount of desorbed oxygen under the situation where the time required for oxygen acquisition is short and the time required for oxygen discharge is long, it is demanded to provide a favorable condition for oxygen discharge. The larger the amount of oxygen adsorption/desorption required per unit time becomes, that is, the larger the intake air quantity Ga becomes, the more remarkable such a demand is. Accordingly, to balance the amount of adsorbed oxygen with the amount of desorbed oxygen within the three-way catalyst when the intake air quantity Ga is large, it is necessary to provide a more favorable condition for oxygen discharge, that is, to make the exhaust gas flowing into the catalysts richer. This explains why the catalyst window is dependent on the intake air quantity Ga as indicated in FIG. 3.

The maximum oxygen occlusion amount Cmax of the three-way catalyst decreases as their deterioration progresses. When the maximum oxygen occlusion amount Cmax is decreased, the three-way catalyst does not readily acquire the oxygen in the exhaust gas. This results in a decrease in the difference between the time required for oxygen acquisition and the time required for oxygen discharge. Therefore, the dependence of the catalyst window on the intake air quantity Ga decreases as three-way catalyst deterioration progresses.

In the foregoing first embodiment, the catalyst characteristic correction amount "evafcat" is rendered dependent on the intake air quantity Ga in such a manner that its dependence agrees with the dependence of the catalyst window on the intake air quantity Ga. However, the dependence of the catalyst characteristic correction amount "evafcat" on the intake air quantity Ga is constant. Therefore, the tendency of catalyst window variation does not agree with the tendency of catalyst characteristic correction amount variation if catalyst deterioration progresses. Under such circumstances, in the present embodiment, detecting the degree of deterioration of upstream catalyst 12 and setting the catalyst characteristic correction amount "evafcat" to an appropriate value in accordance with the detected degree of deterioration are performed.

FIG. 11 is a flowchart illustrating processing steps that the ECU 20 performs to implement the above functionality in the present embodiment. In the present embodiment, the ECU 20 performs steps 140 and 142 in the routine shown in FIG. 5 while replacing them with step 108.

After calculating the sub-feedback learning amount "evafsfbg" (FIG. 5, step 106), the ECU 20 in the present embodiment detects the maximum oxygen occlusion amount Cmax of the upstream catalyst 12 (step 140). The maximum oxygen occlusion amount Cmax can be determined, for instance, by forcibly enriching the control A/F until a rich gas flows downstream of the upstream catalyst 12, then making the control A/F lean, and calculating the cumulative amount of oxygen that flows into the upstream catalyst 12 before gas in an atmosphere of lean flows downstream of the upstream catalyst 12. The method for determining the maximum oxygen occlusion amount Cmax is publicly known and will not be described in detail herein.

Figure 12:
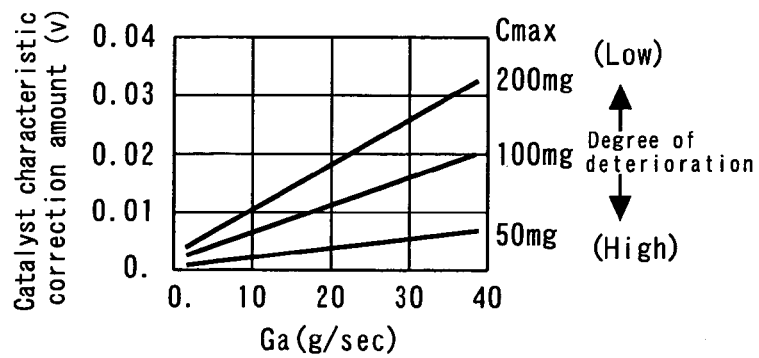
FIG. 12 shows an example of a catalyst characteristic correction amount map that is referenced in step 142, which is shown in FIG. 11.

After the maximum oxygen occlusion amount Cmax of the upstream catalyst 12 is detected, the map shown in FIG. 12 is referenced to set the catalyst characteristic correction amount "evafcat" (step 142). As shown in FIG. 12, the ECU 20 in the present embodiment memorizes the map for the catalyst characteristic correction amount "evafcat", in which the maximum oxygen occlusion amount Cmax is used as a parameter. The map is set so that the smaller the value Cmax is, that is, the higher the degree of deterioration of the upstream catalyst 12 is, the smaller the degree of dependence of the catalyst characteristic correction amount "evafcat" on the intake air quantity Ga is. More specifically, this map is set so that the Ga dependence of the catalyst characteristic correction amount "evafcat" constantly agrees with the Ga dependence of the catalyst window in correspondence with the value Cmax.

The ECU 20 then calculates the corrected A/F output "evabyf" by using the catalyst characteristic correction amount "evafcat" that is set in step 142 above (FIG. 5, step 110), and performs a main feedback sequence so that the corrected A/F output "evabyf" agrees with the target A/F (FIG. 5, steps 112 and 114). In this instance, the control A/F can be properly contained in the catalyst window at all times although the Ga dependence of the catalyst window varies in accordance with the degree of deterioration of upstream catalyst 12. Therefore, the device according to the present embodiment provides a better emission characteristic than the devices according to the first through third embodiments.

Figure 13:
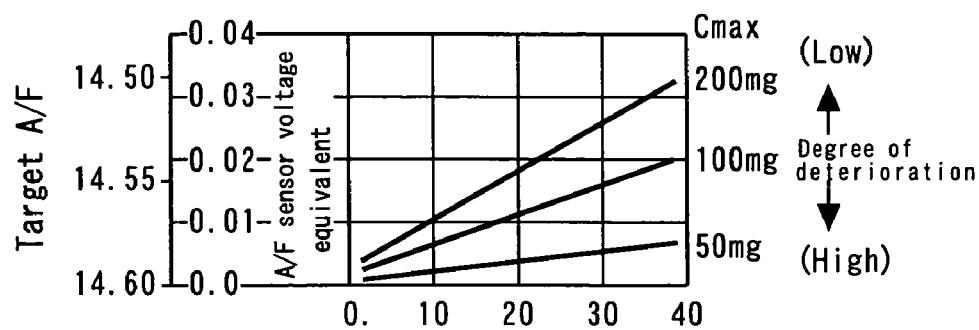
FIG. 13 shows an example of a target A/F map that is referenced in a first modified version of the fourth embodiment according to the present invention.
Figure 14:
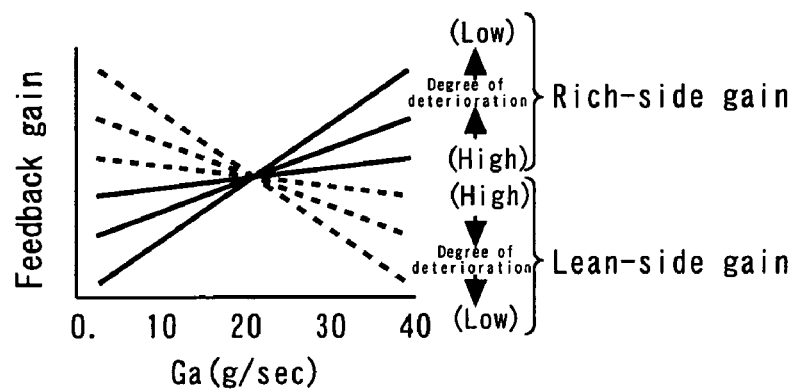
FIG. 14 shows an example of a feedback gain map that is referenced in a second modified version of the fourth embodiment according to the present invention.

As is the case with the first embodiment, the fourth embodiment described above copes with the Ga dependence of the catalyst window by using the catalyst characteristic correction amount "evafcat", and ensures that the degree of catalyst deterioration is reflected in the catalyst characteristic correction amount "evafcat". However, an alternative method may be used to cope with the Ga dependence of the catalyst window. More specifically, the Ga dependence of the catalyst window may be coped with by rendering the target A/F dependent on the value Ga as is the case with the second embodiment or by rendering the feedback gain dependent on the value Ga as is the case with the third embodiment. The former case provides the same advantages as the device according to the fourth embodiment by preparing the map shown in FIG. 13, that is, the target A/F map in which the value Cmax is used as a parameter. The latter case provides the same advantages as the device according to the fourth embodiment by preparing the map shown in FIG. 14, that is, the rich-side/lean-side gain Ga map in which the value Cmax is used as a parameter.

Fifth Embodiment

Figure 15:
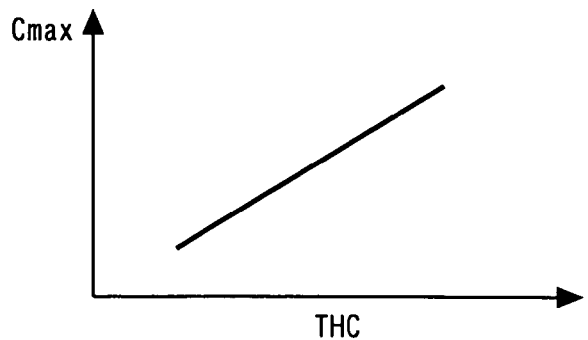
FIG. 15 illustrates the relationship between the catalyst temperature and maximum oxygen occlusion amount of a three-way catalyst.

A fifth embodiment of the present invention will now be described with reference to FIGS. 15 through 17. The device according to the present embodiment is implemented by causing the ECU 20 in the device according to the first embodiment to perform processing steps 150 and 152, which are shown in FIG. 16, in replacement of step 108 above (see FIG. 5).

As described earlier (see the description of the fourth embodiment), the Ga dependence of the catalyst window varies with the maximum oxygen occlusion amount Cmax of the three-way catalyst. The maximum oxygen occlusion amount Cmax of the three-way catalyst varies with the catalyst temperature THC as well as with the degree of catalyst deterioration. FIG. 15 illustrates the relationship between the catalyst temperature THC and maximum oxygen occlusion amount Cmax. As indicated in this figure, the higher the catalyst temperature THC rises, the larger the maximum oxygen occlusion amount Cmax of the three-way catalyst becomes. Therefore, the higher the catalyst temperature THC rises, the greater the Ga dependence exhibited by the catalyst window is. Further, the lower the catalyst temperature THC is, the smaller the Ga dependence exhibited by the catalyst window is. Therefore, in the present embodiment, detecting the catalyst temperature THC of the upstream catalyst 12 and setting the catalyst characteristic correction amount "evafcat" to an appropriate value in accordance with the catalyst temperature THC.

Figure 16:
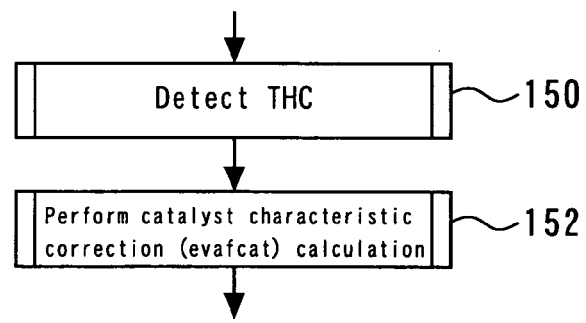
FIG. 16 is a flowchart illustrating processing steps that a fifth embodiment of the present invention performs in replacement of step 108, which is shown in FIG. 5.

FIG. 16 is a flowchart illustrating processing steps that the ECU 20 performs to implement the above functionality in the present embodiment. In the present embodiment, the ECU 20 performs steps 150 and 152 in the routine shown in FIG. 5 while replacing them with step 108.

After terminating a process for calculating the sub-feedback learning amount "evafsfbg" (FIG. 5, step 106), the ECU 20 in the present embodiment detects the catalyst temperature THC of the upstream catalyst 12 (step 150). The catalyst temperature THC can be estimated, for instance, from the intake air quantity Ga and engine revolving speed Ne. Further, the catalyst temperature THC may be measured with a temperature sensor. Since the method for detecting the catalyst temperature THC is not new, it will not be described in detail herein.

Figure 17:
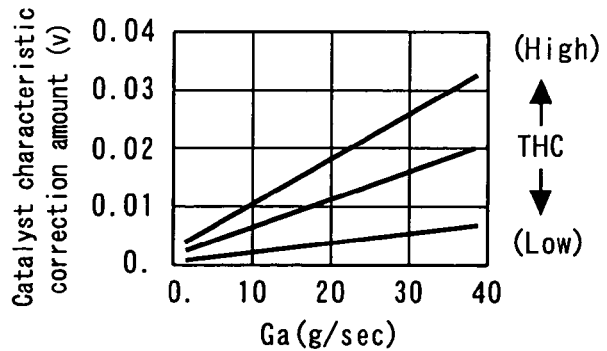
FIG. 17 shows an example of a catalyst characteristic correction amount map that is referenced in step 152, which is shown in FIG. 16.

After the catalyst temperature THC of the upstream catalyst 12 is detected, the map shown in FIG. 17 is referenced to set the catalyst characteristic correction amount "evafcat" (step 152). As shown in FIG. 17, the ECU 20 in the present embodiment memorizes the map for the catalyst characteristic correction amount "evafcat", in which the catalyst temperature THC is used as a parameter. The map is set so that the higher the catalyst temperature THC rises, the more significant the Ga dependence of the catalyst characteristic correction amount "evafcat" is. More specifically, this map is set so that the Ga dependence of the catalyst characteristic correction amount "evafcat" constantly agrees with the Ga dependence of the catalyst window in correspondence with the catalyst temperature THC.

The ECU 20 then calculates the corrected A/F output "evabyf" by using the catalyst characteristic correction amount "evafcat" that is set in step 152 above (FIG. 5, step 110), and performs a main feedback sequence so that the corrected A/F output "evabyf" agrees with the target A/F (FIG. 5, steps 112 and 114). In this instance, the control A/F can be properly contained in the catalyst window at all times although the Ga dependence of the catalyst window varies in accordance with the catalyst temperature THC. Therefore, the device according to the present embodiment provides a better emission characteristic than the devices according to the first through third embodiments.

Figure 18:
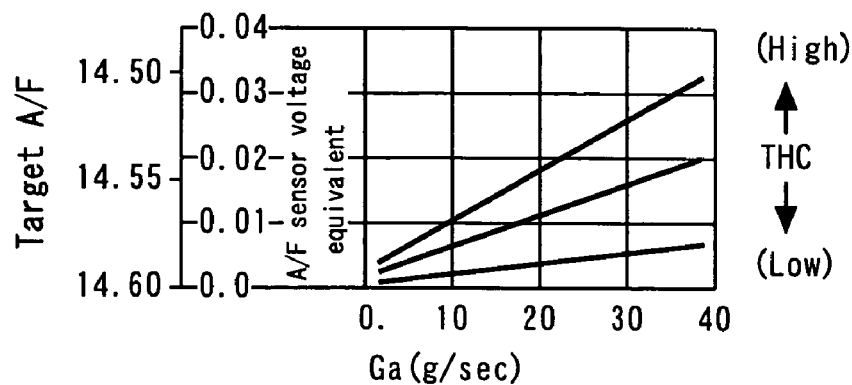
FIG. 18 shows an example of a target A/F map that is referenced in a first modified version of the fifth embodiment according to the present invention.
Figure 19:
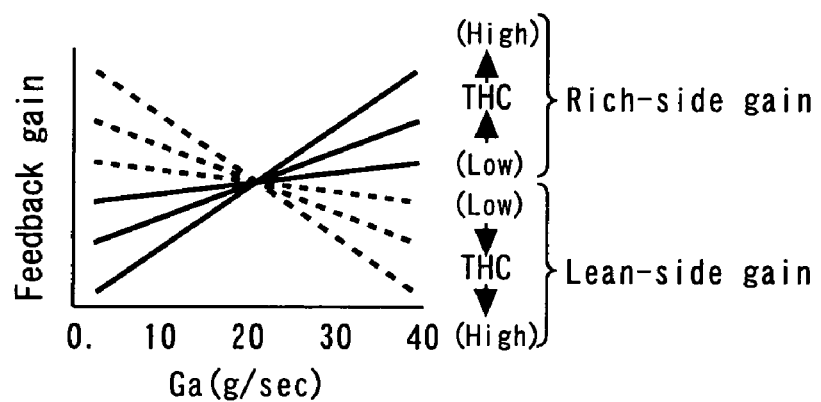
FIG. 19 shows an example of a feedback gain map that is referenced in a second modified version of the fifth embodiment according to the present invention.

As is the case with the first embodiment, the fifth embodiment described above uses the catalyst characteristic correction amount "evafcat" to cope with the Ga dependence of the catalyst window and ensures that the influence of the catalyst temperature THC is reflected in the catalyst characteristic correction amount "evafcat". However, an alternative method may be used to cope with the Ga dependence of the catalyst window. More specifically, the Ga dependence of the catalyst window may be coped with by rendering the target A/F dependent on the value Ga as is the case with the second embodiment or by rendering the feedback gain dependent on the value Ga as is the case with the third embodiment. The former case provides the same advantages as the device according to the fifth embodiment by preparing the map shown in FIG. 18, that is, the target A/F map in which the value THC is used as a parameter. The latter case provides the same advantages as the device according to the fifth embodiment by preparing the map shown in FIG. 19, that is, the rich-side/lean-side gain Ga map in which the value THC is used as a parameter.

In the fifth embodiment described above, only the influence of the catalyst temperature THC is reflected in the catalyst characteristic correction amount "evafcat". Alternatively, however, the influence of catalyst deterioration may be reflected in the catalyst characteristic correction amount "evafcat" in addition to the influence of the catalyst temperature THC as is the case with the fourth embodiment. This modification can also be applied similarly to a case where the target A/F is rendered dependent on the value Ga and a case where the feedback gain is rendered dependent on the value Ga.

Sixth Embodiment

A sixth embodiment of the present invention will now be described with reference to FIGS. 20 through 23. The device according to the sixth embodiment is implemented by causing the ECU 20 in the device according to any one of the first through fifth embodiments to execute a routine shown in FIG. 22 in replacement of steps 104 and 106, which are shown in FIG. 5, 6, or 8.

In the internal-combustion engine, the fuel quantity may be intentionally increased, for instance, by the power increasing for improving purpose of the output at the time of acceleration or by the OTP increasing for catalyst overheat prevention purpose. The waveform in FIG. 20A indicates an air-fuel ratio (referred to as "target A/F") that is targeted for such a fuel quantity increase. The waveform in FIG. 20B indicates the air-fuel ratio (referred to as the "downstream A/F") of an exhaust gas that is discharged downstream of the upstream catalyst 12 upon fuel quantity increase.

As indicated in FIG. 20A, the target A/F is a rich value during a fuel quantity increase. On the other hand, the downstream A/F turns out to a rich value with a predetermined delay after a target A/F change, as indicated in FIG. 20B. Therefore, the downstream A/F is inevitably maintained at a rich value during the time interval between the instant at which the fuel quantity increase terminates and the instant at which the delay elapses.

As is the case with the devices according to the first through fifth embodiments, the device according to the present embodiment exercises air-fuel ratio control by performing a combination of main feedback and sub-feedback. This air-fuel ratio control operation is halted during a fuel quantity increase during which the target A/F value is intentionally enriched. Therefore, the downstream A/F value will not possibly be reflected in the sub-feedback learning amount "evafsfbg" even if it is rich during the fuel quantity increase.

However, if the above air-fuel ratio control operation is resumed at the end of the fuel quantity increase and the update of the sub-feedback learning amount "evafsfbg" is resumed simultaneously, the sub-feedback learning amount "evafsfbg" is inappropriately updated while the downstream A/F is still affected by the fuel quantity increase. To avoid such an inappropriate update, it is necessary to inhibit the update of the sub-feedback learning amount "evafsfbg" during the time interval between the instant at which the fuel quantity increase ends and the instant at which the downstream A/F ceases to be affected by the fuel quantity increase.

When the amount of air circulation is sufficient after termination of the fuel quantity increase, the downstream A/F ceases to be affected by the fuel quantity increase. Whether the downstream A/F is no longer affected by the fuel quantity increase can be determined by judging whether a predetermined judgment value (e.g., 20 g) is reached by an integrated intake air quantity value "gasum" after termination of the fuel quantity increase.

Whether the downstream A/F is no longer affected by the fuel quantity increase can also be determined by actually measuring the downstream A/F by the sub-oxygen sensor 18 and judging whether it is rich or not. In other words, if the output of the sub-oxygen sensor 18 is not rich after termination of the fuel quantity increase, it can be concluded that the downstream A/F is no longer affected by the fuel quantity increase in general cases.

FIGS. 21A and 21B are timing diagrams illustrating cases where erroneous judgments are performed through the use of the above method. FIG. 21A indicates target A/F changes that occur when a fuel quantity increase operation is performed for a short period of time. FIG. 21B indicates downstream A/F changes that occur when a fuel quantity increase operation is performed for a short period of time. When the fuel quantity increase operation ends within a short period of time, the downstream A/F may begin to be affected by a fuel quantity increase with a certain delay after the end of the fuel quantity increase, as indicated in the figure. In such a situation, the downstream A/F value is not rich immediately after the end of the fuel quantity increase. Therefore, when the judgment method described above is used, it is erroneously concluded on the time point that the influence of the fuel quantity increase is gone.

The time interval, which is generated in a situation where the fuel quantity increase terminates within a short period of time, between the instant at which the fuel quantity increase is terminated and the instant at which the downstream A/F begins to be affected by the fuel quantity increase can be grasped, for instance, by an adjustment manner. Therefore, the above-mentioned erroneous judgment can be avoided by inhibiting the output of the sub-oxygen sensor 18 from being used for judgment purposes until the above-mentioned time interval elapses after the end of the fuel quantity increase. Therefore, in the present embodiment, judges whether the downstream A/F is no longer affected by the fuel quantity increase are performed by determining firstly whether the integrated intake air quantity "gasum" generated after termination of the fuel quantity increase is sufficient and secondly whether a non-rich output is generated by the sub-oxygen sensor 18 after the above-mentioned inhibition period. In the present embodiment, the update of the sub-feedback learning amount "evafsfbg" is inhibited from being resumed until it is concludes that the influence of the fuel quantity increase is gone by either method described above.

Figure 22:
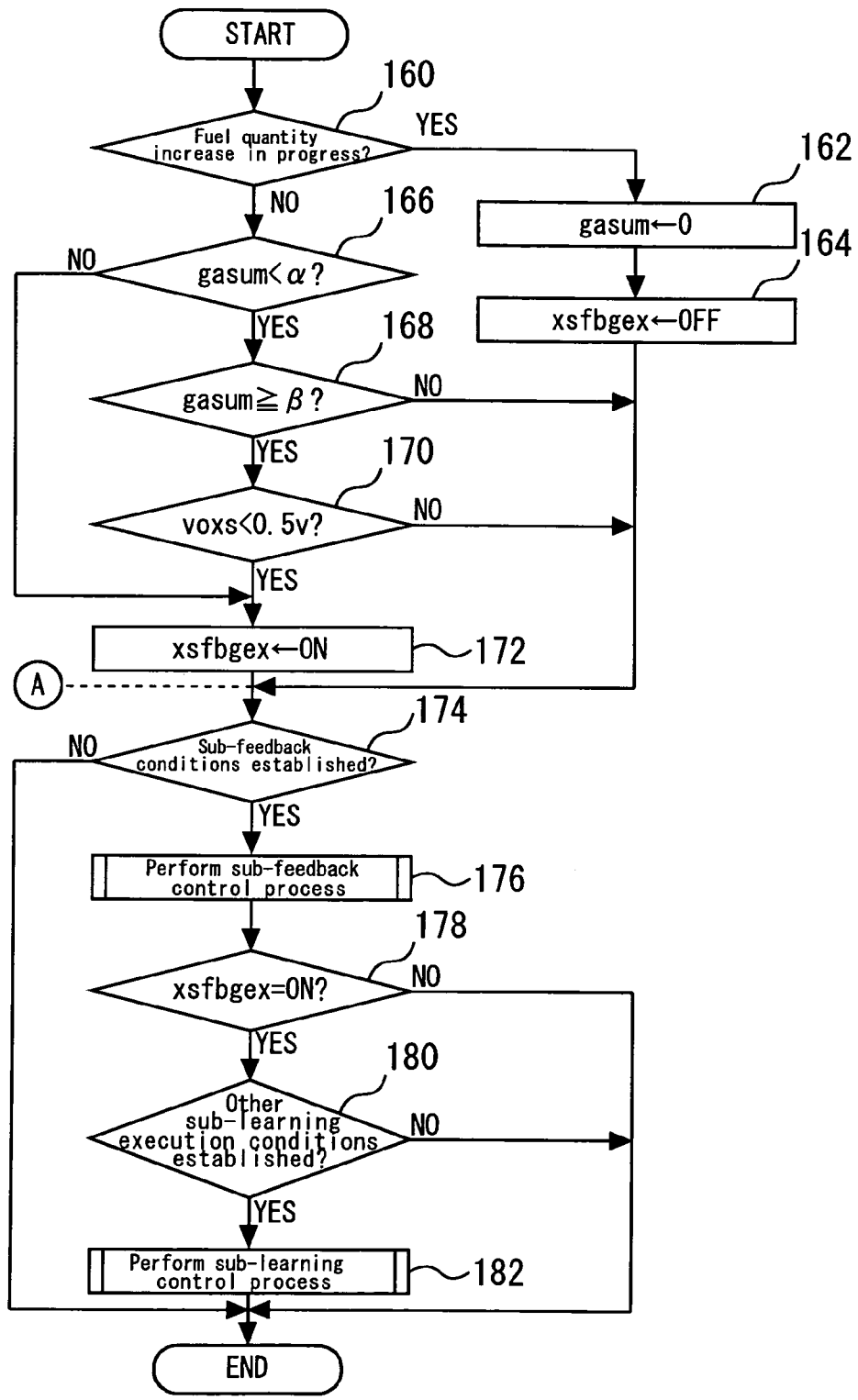
FIG. 22 is a flowchart illustrating a control routine that is executed by a sixth embodiment of the present invention.

FIG. 22 is a flowchart illustrating a routine that the ECU 20 executes in the present embodiment to implement the above functionality. In this routine, step 160 is first performed to judge whether a fuel quantity increase operation is performed in the internal-combustion engine. If it is found that a fuel quantity increase operation is being performed (the answer to the query in step 160 is Yes), the integrated intake air quantity "gasum" is set to 0 (step 162), and then a sub-feedback learning execution flag "xsfbgex" turns OFF (step 164). As described later, the ECU 20 performs an update process for the sub-feedback learning amount "evafsfbg" on the condition that the sub-feedback learning execution flag "xsfbgex" be ON. According to the above process, therefore, the update of the sub-feedback learning amount "evafsfbg" can be inhibited while the fuel quantity increase is in progress.

If it is found in step 160 that no fuel quantity increase operation is being performed (the answer to the query in step 160 is No), step 166 is performed to judge whether the integrated intake air quantity "gasum" is smaller than a sub-learning permission amount α (e.g., 20 g). It is assumed that the integrated intake air quantity "gasum" is determined each time processing step 166 is performed by adding the quantity of intake air Ga flowing between the previous processing cycle and current processing cycle to the "gasum" value calculated on the previous processing cycle.

Sub-learning permission amount a, which is mentioned above, is set as a value that is required for the downstream A/F to become unaffected by the fuel quantity increase. Therefore, if the value "gasum" is not smaller than α, it can be concluded that the downstream A/F is no longer affected by the fuel quantity increase. In such a situation, the program flow skips processing steps 168 and 170 and immediately proceeds to perform processing step 172.

If, on the other hand, it is found in step 166 that "gasum" is smaller than α, it is impossible to judge, as far as the integrated intake air quantity "gasum" is used as fundamental data, whether the downstream A/F is no longer affected by the fuel quantity increase. In this instance, step 168 is performed to check again whether the influence of the fuel quantity increase is gone. More specifically, step 168 is completed to judge whether the integrated intake air quantity "gasum" is not smaller than judgment permission amount β (e.g., 5 g).

Judgment permission amount β is a maximum value of the integrated intake air quantity "gasum" that may arise during the time interval between the instant at which a short-time fuel quantity increase is terminated and the instant at which the downstream A/F begins to be affected by the fuel quantity increase. If it is found in step 168 that the value "gasum" is smaller than β, it is conceivable that there is possibility that the downstream A/F is still not affected by the fuel quantity increase. In such an instance, it is not possible to determine whether the downstream A/F is no longer affected by the fuel quantity increase on the basis of the current output of the sub-oxygen sensor 18. Consequently, the program flow skips processing steps 170 and 172 to inhibit the use of the sub-oxygen sensor output for judgment purposes.

If, on the other hand, it is found in step 168 that the value "gasum" is equal to or larger than β, it can be concluded that the current output of the sub-oxygen sensor 18 indicates whether the downstream A/F is still affected by the fuel quantity increase. In this instance, step 170 is then performed to judge whether a non-rich output is generated by the sub-oxygen sensor 18. More specifically, step 170 is completed to determine whether the sensor's output "voxs" is smaller than 0.5 V.

If it is found in step 170 that the value "voxs" is not smaller than 0.5 V, that is, if it can be judged that a rich output is generated by the sub-oxygen sensor 18, it can be concluded that the downstream A/F is still affected by the fuel quantity increase. In such an instance, it is concluded that the update of the sub-feedback learning amount "evafsfbg" should not be permitted. The program flow then skips processing step 172.

If, on the other hand, it is found in step 170 that the value "voxs" is smaller than 0.5 V, it can be concluded that the downstream A/F is no longer affected by the fuel quantity increase. In this instance, the sub-feedback learning execution flag "xsfbgex" turns ON to permit the update of the sub-feedback learning amount "evafsfbg" (step 172).

Next, step 174, which is included in the routine shown in FIG. 22, is performed to judge whether the sub-feedback execution conditions are established. If it is found that the execution conditions are not established, the program flow immediately terminates the current processing cycle. If, on the other hand, it is found in step 174 that the sub-feedback execution conditions are established, the program flow proceeds to step 176 in which a process required for sub-feedback is performed. More specifically, step 176 is completed to calculate the sub-feedback correction amount "evafsfb" by the same method as described in conjunction with the first embodiment.

Next, step 178, which is included in the routine shown in FIG. 22, is performed to judge whether the sub-feedback learning execution flag "xsfbgex" is ON. If it is found that the sub-feedback learning execution flag "xsfbgex" is not ON, the program flow terminates the current processing cycle without updating the sub-feedback learning amount "evafsfbg". If, on the other hand, it is found in step 178 that the sub-feedback learning execution flag "xsfbgex" is ON, the sub-feedback learning amount "evafsfbg" is updated (step 182) on the condition that the other execution conditions be established (step 180). According to a series of processing steps described above, it is possible to properly inhibit the sub-feedback learning amount "evafsfbg" from being updated after a fuel quantity increase is terminated and while an influence thereof remains in the downstream A/F. Then, the processing steps can permit such an update only after the influence of the fuel quantity increase is gone.

FIGS. 23A to 23D are timing diagrams illustrating advantages that are provided when the above inhibition function is exercised. FIG. 23A shows a waveform of the output "voxs" of the sub-oxygen sensor 18 that is generated in an environment where a fuel quantity increase operation is appropriately performed. FIG. 23B shows waveforms of the sub-feedback learning amounts "evafsfbg" that are generated in the above-mentioned environment. These two waveforms are presented for comparing a case where the above inhibition function is exercised and a case where the above inhibition function is not exercised. FIGS. 23C and 23D show waveforms of the intake air quantity Ga and vehicle velocity, respectively.

As is obvious from waveforms shown in FIG. 23B, the sub-feedback learning amount "evafsfbg" unduly varies if it is not inhibited from being updated while the downstream A/F is affected by a fuel quantity increase correction. On the other hand, if the sub-feedback learning amount "evafsfbg" is inhibited from being updated, it is possible to suppress changes in the sub-feedback learning amount "evafsfbg", thereby allowing its value to make a steady transition. As described above, the device according to the present embodiment can effectively prevent the learning amount "evafsfbg" from being updated to an inappropriate value the sub-feedback learning amount "evafsfbg" is inhibited from being updated after a fuel quantity increase is terminated and while influence thereof may remain in downstream A/F. As a result, the device according to the present embodiment provides a better emission characteristic than the device according to the first through fifth embodiments.

Seventh Embodiment

A seventh embodiment of the present invention will now be described with reference to FIG. 24. The device according to the seventh embodiment is implemented by causing the ECU 20 in the device according to the sixth embodiment to perform a process shown in FIG. 24 in replacement of steps 160 through 172, which are shown in FIG. 22.

The device according to the sixth embodiment, which is described earlier, copes with a situation where the influence of a fuel quantity increase is gone within a short period of time by means of setting a sufficiently great fixed value (e.g., 20 g) as the sub-learning permission amount α, and judging the output of the sub-oxygen sensor 18. The period of time required for the downstream A/F to become unaffected by a fuel quantity increase correlates with the integrated amount of oxygen deficiency "dosc" that occurs during a fuel quantity increase. Therefore, the device according to the present embodiment determines the integrated amount of oxygen deficiency "dosc" during a fuel quantity increase, sets the sub-learning permission amount a that corresponds to the integrated value "dosc" after termination of the fuel quantity increase, and judges whether the downstream A/F is no longer affected by the fuel quantity increase by checking whether the sub-learning permission amount a is reached by the integrated intake air quantity "gasum".

FIG. 24 is a flowchart illustrating a series of processing steps that the ECU 20 performs to implement the above functionality in the present embodiment. In the present embodiment, the ECU 20 performs the illustrated processing steps in the routine shown in FIG. 22 while replacing them with steps 160 through 172. Steps that are indicated in FIG. 24 and identical with the steps shown in FIG. 22 are assigned the same reference numerals as their counterparts and will be briefly described or will not be described again.

In a routine shown in FIG. 24, step 160 is performed to judge whether a fuel quantity is being increased. If it is found in step 160 that the fuel quantity is being increased (the answer to the query in step 160 is Yes), following step 160, step 190 is performed to calculate the integrated amount of oxygen deficiency "dosc". In the present embodiment, the fuel injection quantity is determined by the time for opening the fuel injection valve 26, that is, a fuel injection time TAU. While the fuel quantity is being increased, the fuel injection time TAU is calculated by multiplying a basic fuel injection time TP by a fuel increase coefficient K (>1.0). The basic fuel injection time TP is the injection time for attaining the theoretical air-fuel ratio, that is, the fuel injection time for generating an exhaust gas in which neither deficiency nor excessiveness exists in oxygen. In this instance, the amount of oxygen deficiency in an exhaust gas arising out of a fuel quantity increase can be calculated as Ga×(fuel increase coefficient K−1). In step 190, the integrated value of above deficiency "Σ{Ga×(fuel increase coefficient K−1)}" is calculated as the integrated amount of oxygen deficiency "dosc".

After termination of step 190, step 164 is performed and then steps 174 and beyond are performed as indicated in FIG. 22. In this instance, step 164 is performed to turn OFF the sub-feedback learning execution flag "xsfbgex". Therefore, the sub-feedback learning amount "evafsfbg" is inhibited from being updated.

If it is found in step 160, which is included in the routine shown in FIG. 24, that the fuel quantity is not being increased, step 192 is performed to calculate the sub-learning permission amount α=f(dosc). As shown in FIG. 24, the ECU 20 memorizes a map of the sub-learning permission amount α, which is defined in relation to the integrated amount of oxygen deficiency "dosc". The map is referenced to calculate the sub-learning permission amount α that corresponds to the value "dosc". The map is set so that the greater the value "dosc" is, the greater the value α becomes while guarded by a predetermined upper-limit value. Therefore, step 192 ensures that the larger the amount of oxygen deficiency during a fuel quantity increase becomes, the greater the value of the sub-learning permission amount α is set.

Next, step 194, which is included in the routine shown in FIG. 24, is performed to judge whether the integrated intake air quantity "gasum" is equal to or greater than the sub-learning permission amount α. If it is found in step 194 that the value gasum is smaller than the value α, it is concluded that the intake air quantity Ga does not flow sufficiently for eliminating influence of a fuel quantity increase from the downstream A/F after the termination thereof. As a result, steps 164 and beyond are then performed. In this instance, the sub-feedback learning amount "evafsfbg" is continuously inhibited from being updated.

If, on the other hand, it is found in step 194 that gasum≧α is satisfied, it can be concluded that the downstream A/F is no longer affected by the fuel quantity increase. Within the routine shown in FIG. 24, step 172 is then performed to turn ON the sub-feedback learning execution flag "xsfbgex". Next, step 196 is performed to reset the integrated amount of oxygen deficiency "dosc" to zero (0). Further, steps 174 and beyond are then performed as indicated in FIG. 22. When steps 174 and beyond are performed in this manner, the update of the sub-feedback learning amount "evafsfbg" is permitted because the sub-feedback learning execution flag "xsfbgex" is ON.

The process described above is performed to calculate a practical sub-learning permission amount a in accordance with the integrated amount of oxygen deficiency "dosc". Then a check is made after termination of a fuel quantity increase whether the integrated intake air quantity "gasum" has reached its sub-learning permission amount a in order to judge whether the downstream A/F is no longer affected by the fuel quantity increase. In this instance, the resumption of the update of the sub-feedback learning amount "evafsfbg" can be permitted approximately when the influence of the fuel quantity increase is actually gone without resort to the output of the sub-oxygen sensor 18 after termination of the fuel quantity increase. Therefore, the device according to the present embodiment provides the same emission characteristic as the device according to the sixth embodiment by exercising simplified control.

The major benefits of the present invention described above are summarized as follows:

According to a first aspect of the present invention, main feedback control and sub-feedback control can be exercised to accurately control the air-fuel ratio so that the larger the intake air quantity becomes, the richer the air-fuel ratio of an exhaust gas flowing into the catalyst is. The catalyst window tends to become richer as the intake air quantity increases. Therefore, the present invention constantly provides a satisfactory emission characteristic no matter what operation is performed by the internal-combustion engine.

A second aspect of the present invention ensures that the larger the intake air quantity becomes, the leaner the corrected air-fuel ratio output is. When the air-fuel ratio output is shifted toward the lean side for correction purposes, the actual air-fuel ratio shifts toward the rich side. Therefore, the present invention ensures that the larger the intake air quantity becomes, the richer the actual air-fuel ratio is. As a result, the actual air-fuel ratio can be adjusted for the catalyst window.

A third aspect of the present invention ensures that the larger the intake air quantity becomes, the richer the target air-fuel ratio is. As a result, the actual air-fuel ratio can be adjusted for the catalyst window.

A fourth aspect of the present invention ensures that the larger the intake air quantity becomes, the higher the ratio between the rich-side gain and lean-side gain is (rich-side gain/lean-side gain), which is used for main feedback control. When the ratio becomes higher, it is easier for main feedback control to enrich the air-fuel ratio. As a result, the present invention makes the actual air-fuel ratio adjusted for the catalyst window in accordance with the intake air quantity.

A fifth aspect of the present invention ensures that the larger the intake air quantity becomes, the higher the ratio between the rich-side gain and lean-side gain is (rich-side gain/lean-side gain), which is used for sub-feedback control. When the ratio becomes higher, it is easier for sub-feedback control to enrich the air-fuel ratio. As a result, the present invention makes the actual air-fuel ratio adjusted for the catalyst window in accordance with the intake air quantity.

A sixth aspect of the present invention ensures that the higher the degree of catalyst deterioration is, the smaller the air-fuel ratio change in an exhaust gas flowing into the catalyst is in relation to a change in the intake air quantity. The catalyst window decreases the dependence on the intake air quantity as catalyst deterioration progresses. The present invention provides high-precision air-fuel ratio control by varying the fuel injection quantity calculation method in accordance with such a change in the characteristic.

A seventh aspect of the present invention ensures that the higher the catalyst temperature rises, the larger the air-fuel ratio change in an exhaust gas flowing into the catalyst is in relation to a change in the intake air quantity. The catalyst window increases the dependence on the intake air quantity as the catalyst temperature becomes higher. The present invention provides high-precision air-fuel ratio control by varying the fuel injection quantity calculation method in accordance with such a change in the characteristic.

An eighth aspect of the present invention inhibits a sub-feedback learning coefficient from being updated during the time interval between the instant at which the fuel injection quantity is increased for correction and the instant at which the influence of such correction is lost. As a result, the present invention effectively inhibits erroneous learning of the sub-feedback learning coefficient, which may be involved in fuel injection quantity increase for correction.

A ninth aspect of the present invention concludes that the influence of fuel injection quantity increase for correction is lost when a predetermined sub-learning permission amount is reached by an integrated intake air quantity after termination of fuel injection quantity increase for correction. As a result, the present invention prevents the erroneously concluding that the influence is lost before the influence is actually lost.

According to a tenth aspect of the present invention, the output of the downstream exhaust gas sensor is used to judge whether the influence of fuel injection quantity increase for correction is lost. Therefore, it is possible to conclude, immediately after the influence is actually lost, that the influence is lost. Further, the present invention inhibits the above judgment based on the downstream exhaust gas sensor output, until the integrated intake air quantity reaches a predetermined judgment permission amount after termination of a fuel injection. As a result, the present invention properly prevents the sub-feedback learning coefficient from being erroneously learned in a situation where the air-fuel ratio changes with a delay after short-term fuel injection quantity increase for correction.

According to an eleventh aspect of the present invention, the sub-learning permission amount can be set in accordance with the integrated amount of oxygen deficiency in an exhaust gas flowing through the catalyst during fuel injection quantity increase for correction. In this instance, it is possible to determine, without resort to the downstream exhaust gas sensor output, whether the sub-learning permission amount is reached by the integrated intake air quantity. Therefore, the present invention makes a judgment accurate whether the influence of fuel injection quantity increase for correction is lost or not.

Further, the present invention is not limited to these embodiments, but variations and modifications may be made without departing from the scope of the present invention. The entire disclosure of Japanese Patent Application No. 2003-283087 filed on Jul. 30, 2003 including specification, claims, drawings and summary are incorporated herein by reference in its entirety.

The invention claimed is:

1. An air-fuel ratio control device for an internal-combustion engine, the air-fuel ratio control device comprising:
 a catalyst positioned in an exhaust path of the internal combustion engine;
 an upstream exhaust gas sensor positioned upstream of said catalyst;
 a downstream exhaust gas sensor positioned downstream of said catalyst;
 main feedback means for feeding back the output of said upstream exhaust gas sensor to fuel injection quantity so that the air-fuel ratio of an exhaust gas flowing into said catalyst coincides with a target air-fuel ratio;
 sub-feedback means for feeding back the output of said downstream exhaust gas sensor to the fuel injection quantity so that the air-fuel ratio of an exhaust gas flowing out of said catalyst coincides with a theoretical air-fuel ratio;
 intake air quantity detection means for detecting the intake air quantity of the internal-combustion engine; and
 injection quantity correction means for correcting the fuel injection quantity to always ensure that the larger said intake air quantity becomes, the richer the air-fuel ratio of an exhaust gas flowing into said catalyst is.

2. The air-fuel ratio control device for an internal-combustion engine according to claim 1, wherein said main feedback means includes means for calculating the fuel injection quantity to ensure that a corrected air-fuel ratio output corresponds to the target air-fuel ratio, and said injection quantity correction means includes means for making corrections to ensure that the larger said intake air quantity becomes, the leaner said corrected air-fuel ratio output is in relation to the output of said upstream exhaust gas sensor.

3. The air-fuel ratio control device for an internal-combustion engine according to claim 1, wherein said main feedback means includes means for ensuring that the larger said intake air quantity becomes, the richer said target air-fuel ratio is.

4. The air-fuel ratio control device for an internal-combustion engine according to claim 1, wherein said main feedback means includes means for ensuring, when the air-fuel ratio of an exhaust gas flowing into said catalyst is leaner than the target air-fuel ratio, that the resulting air-fuel ratio difference is reflected in the fuel injection quantity at a rich-side gain, and means for ensuring, when the air-fuel ratio of an exhaust gas flowing into said catalyst is richer than the target air-fuel ratio, that the resulting air-fuel ratio difference is reflected in the fuel injection quantity at a lean-side gain; and said injection quantity correction means includes means for setting gains to ensure that the larger the intake air quantity becomes, the greater the ratio (rich-side gain/lean-side gain) of said rich-side gain and said lean-side gain is.

5. The air-fuel ratio control device for an internal-combustion engine according to claim 1, wherein said sub-feedback means includes means for ensuring, when the air-fuel ratio of an exhaust gas flowing out of said catalyst is leaner than the theoretical air-fuel ratio, that the resulting air-fuel ratio difference is reflected in the fuel injection quantity at a rich-side gain, and means for ensuring, when the air-fuel ratio of an exhaust gas flowing out of said catalyst is richer than the theoretical air-fuel ratio, that the resulting air-fuel ratio difference is reflected in the fuel injection quantity at a lean-side gain; and said injection quantity correction means includes means for setting gains to ensure that the larger the intake air quantity becomes, the greater the ratio (rich-side gain/lean-side gain) between said rich-side gain and said lean-side gain is.

6. The air-fuel ratio control device for an internal-combustion engine according to claim 1, further comprising catalyst deterioration detection means for detecting the deterioration of said catalyst, wherein said injection quantity correction means includes means for ensuring that the higher the degree of deterioration of said catalyst is, the smaller the air-fuel ratio change in an exhaust gas flowing into said catalyst is in relation to a change in said intake air quantity.

7. The air-fuel ratio control device for an internal-combustion engine according to claim 1, further comprising catalyst temperature detection means for detecting the temperature of said catalyst, wherein said injection quantity correction means includes means for ensuring that the higher the temperature of said catalyst rises, the larger the air-fuel ratio change in an exhaust gas flowing into said catalyst is in relation to a change in said intake air quantity.

8. The air-fuel ratio control device for an internal-combustion engine according to claim 1, wherein said sub-feedback means includes:

means for calculating a sub-feedback correction coefficient for ensuring that the richer the output of said downstream exhaust gas sensor is, the smaller the fuel injection quantity becomes, and that the leaner the output of said downstream exhaust gas sensor is, the larger the fuel injection quantity becomes;

means for learning an average value of said sub-feedback correction coefficient as a sub-feedback learning coefficient; and means for ensuring that said sub-feedback learning coefficient is reflected in the fuel injection quantity, the air-fuel ratio control device further comprising:

influence presence judgment means for judging whether the air-fuel ratio of an exhaust gas flowing out of said catalyst is no longer affected by the influence of a fuel injection quantity increase for correction; and learning inhibition means for inhibiting said sub-feedback learning coefficient from being updated during a period during which said influence is considered to be exerted.

9. The air-fuel ratio control device for an internal-combustion engine according to claim 8, wherein said influence presence judgment means includes:

means for calculating an integrated intake air quantity prevailing after termination of the fuel injection quantity increase for correction; and means for concluding that said influence is lost when a predetermined sub-learning permission amount is reached by said integrated intake air quantity.

10. The air-fuel ratio control device for an internal-combustion engine according to claim 9, wherein said influence presence judgment means includes:

means for judging that said influence is lost when said downstream exhaust gas sensor generates a lean output in an environment where the fuel injection quantity is not increased for correction; and means for inhibiting said judgment, which is based on the output of said downstream exhaust gas sensor, until a predetermined judgment permission amount is reached by said integrated intake air quantity.

11. The air-fuel ratio control device for an internal-combustion engine according to claim 9, further comprising:

integrated oxygen deficiency amount calculation means for determining the integrated amount of oxygen deficiency in an exhaust gas flowing through said catalyst during the fuel injection quantity increase for correction; and sub-learning permission amount setup means for setting said sub-learning permission amount in accordance with the integrated amount of said oxygen deficiency.

12. An air-fuel ratio control device for an internal-combustion engine, the air-fuel ratio control device comprising:

a catalyst positioned in an exhaust path of the internal combustion engine;

an upstream exhaust gas sensor positioned upstream of said catalyst;

main feedback means for feeding back the output of said upstream exhaust gas sensor to fuel injection quantity so that the air-fuel ratio of an exhaust gas flowing into said catalyst coincides with a target air-fuel ratio;

intake air quantity detection means for detecting the intake air quantity of the internal-combustion engine; and injection quantity correction means for correcting the fuel injection quantity to always ensure that the larger said intake air quantity becomes, the richer the air-fuel ratio of an exhaust gas flowing into said catalyst is.

13. The air-fuel ratio control device for an internal-combustion engine according to claim 12, wherein said main feedback means includes means for calculating the fuel injection quantity to ensure that a corrected air-fuel ratio output corresponds to the target air-fuel ratio, and said injection quantity correction means includes means for making corrections to ensure that the larger said intake air quantity becomes, the leaner said corrected air-fuel ratio output is in relation to the output of said upstream exhaust gas sensor.

14. The air-fuel ratio control device for an internal-combustion engine according to claim 12, wherein said main feedback means includes means for ensuring that the larger said intake air quantity becomes, the richer said target air-fuel ratio is.

15. The air-fuel ratio control device for an internal-combustion engine according to claim 12, wherein said main feedback means includes means for ensuring, when the air-fuel ratio of an exhaust gas flowing into said catalyst is leaner than the target air-fuel ratio, that the resulting air-fuel ratio difference is reflected in the fuel injection quantity at a rich-side gain, and means for ensuring, when the air-fuel ratio of an exhaust gas flowing into said catalyst is richer than the target air-fuel ratio, that the resulting air-fuel ratio difference is reflected in the fuel injection quantity at a lean-side gain; and said injection quantity correction means includes means for setting gains to ensure that the larger the intake air quantity becomes, the greater the ratio (rich-side gain/lean-side gain) of said rich-side gain and said lean-side gain is.

16. The air-fuel ratio control device for an internal-combustion engine according to claim 12, further comprising catalyst deterioration detection means for detecting the deterioration of said catalyst, wherein said injection quantity correction means includes means for ensuring that the higher the degree of deterioration of said catalyst is, the smaller the air-fuel ratio change in an exhaust gas flowing into said catalyst is in relation to a change in said intake air quantity.

17. The air-fuel ratio control device for an internal-combustion engine according to claim 12, further comprising catalyst temperature detection means for detecting the temperature of said catalyst, wherein said injection quantity correction means includes means for ensuring that the higher the temperature of said catalyst rises, the larger the air-fuel ratio change in an exhaust gas flowing into said catalyst is in relation to a change in said intake air quantity.

* * * * *